United States Patent [19]

Gerring

[11] 4,358,883
[45] Nov. 16, 1982

[54] VEHICLE TOP STRUCTURE AND METHOD OF ASSEMBLY

[75] Inventor: Harold E. Gerring, Bristol, Ind.

[73] Assignee: Ger-Win Vans, Inc., Bristol, Ind.

[21] Appl. No.: 103,586

[22] Filed: Dec. 14, 1979

[51] Int. Cl.³ .......................... B23P 7/00; B60J 7/00
[52] U.S. Cl. .................................. 29/401.1; 296/211; 296/214; 296/218
[58] Field of Search ............... 29/401.1; 296/211, 214, 296/218

[56] References Cited

U.S. PATENT DOCUMENTS

| | | | |
|---|---|---|---|
| 1,652,359 | 12/1927 | Hill | 296/211 |
| 1,850,705 | 3/1932 | Carlson | 296/211 |
| 2,466,366 | 4/1949 | Braun | 296/137 |
| 2,768,026 | 10/1956 | Stephens et al. | 296/137 |
| 2,816,794 | 12/1957 | Temp | 29/401.1 |
| 3,719,383 | 3/1973 | Ferro | 296/26 |
| 3,815,307 | 6/1974 | Tantlinger | 296/211 |
| 3,867,240 | 2/1975 | Doerfling | 296/214 |
| 3,953,067 | 4/1976 | Isola | 296/214 |
| 4,099,313 | 7/1978 | Phillips | 29/401.1 |
| 4,101,159 | 7/1978 | Stewart | 296/214 |
| 4,211,590 | 7/1980 | Steward et al. | 296/214 |
| 4,231,144 | 11/1980 | Bernacchia, Jr. | 29/401.1 |
| 4,238,876 | 12/1980 | Monroe et al. | 29/401.1 |
| 4,261,615 | 4/1981 | Deaver | 29/401.1 |

OTHER PUBLICATIONS

*Automobile Body Reconditioning*, by Wohlfeil et al., McGraw-Hill Book Co. Inc., 1952, pp. 109, 108, 107, 106, 105.

Primary Examiner—Francis S. Husar
Assistant Examiner—V. K. Rising
Attorney, Agent, or Firm—Barnes & Thornburg

[57] ABSTRACT

A rigid vehicle top of unitary construction and method of making the same is provided. The rigidity of the roof and headliner portions allows for the complete off-line assembly of lighting systems, switches, clocks, environmental control apparatus and decorations. Additionally, a method of converting an existing passenger vehicle is provided.

12 Claims, 7 Drawing Figures

VEHICLE TOP STRUCTURE AND METHOD OF ASSEMBLY

BACKGROUND AND SUMMARY OF THE INVENTION

The general field of the present invention is that of vehicle body top structures and their methods of assembly. While various top structures for vehicles have been known for many years, it has not been until the recent windspread utilization and, especially mass assembly, of the automobile and other motor vehicles that on simplicity, reproducibility and cost-effectiveness has lead to an ever increasing interest in structural and assembly improvements.

Early attempts at improvements in this field are exemplified by U.S. Pat. Nos. 2,020,346 and 2,466,366. Other more recent designs and methods are demonstrated by U.S. Pat. Nos. 2,768,026; 3,300,357; 3,719,383; 3,953,067; 4,119,749; and U.S. Pat. Nos. Des. 203,033; 213,189; 239,101; and 251,292.

As pointed out in U.S. Pat. No. 3,953,067, there are generally two different types of vehicle top structures and consequently, methods of assembly. These two types are (1) cut- and sewn and (2) molded. The cut- and sewn structure is fabricated and installed by highly skilled laborers at an assembly plant whereas the molded structure may be molded elsewhere and installed by slipping it through the front window or back light opening. Both of these methods demand an excessive amount of installation time and therefore promulgate excessive labor costs due to the necessary utilization of highly skilled labor within a cramped and crowded working area; namely the passenger or storage area of the motor vehicle being assembled.

The present invention relates to a rigid vehicle top of unitary construction which may be unitarily attached to the vehicle body after the complete off-line assembly of all electrical (i.e. clocks, radios, etc.) and mechanical (i.e. ventilation ducts, storage spaces, etc.) components of the vehicle top. This construction assembly eliminates many of the problems existing in the present vehicle top assembly methods. In particular, the present method promulgates a substantial reduction in labor costs over the presently existing methods. The labor cost reduction is a direct result of the application of the presently disclosed inventive method and structure since assembly of the vehicle top is achieved at an off-line assembly location which may or may not be within an assembly plant. The off-line assembly of the vehicle top from its component parts (i.e. roof portions, headliners, clocks, ventilation ducts, etc.) allows the workers ready access to the inside area of the vehicle top thus totally obviating the necessity of assembling the components of the vehicle top and headliner within the confines of the vehicle passenger or cargo area, itself. Therefore, the rigid vehicle top of unitary structure of this invention may be unitarily attached to the vehicle body at a predetermined point or points in the assembly line.

This invention relates generally to vehicle top structure and more particularly to a new improved vehicle top structure and method of attaching the same which is intended to overcome the many disadvantages and objectional features of both the cut- and sewn and molded vehicle top structures.

Various advantages, aspects and objects of the present invention include:

(i) to provide a new and improved vehicle top structure;

(ii) to provide a new and improved method of affixation (attachment of the vehicle top structure to the vehicle body);

(iii) to provide a vehicle top structure that has the customized appearance of either cut- and sewn or molded type structures, but which eliminates many of the problems of assembly and fitting associated therewith;

(iv) to provide a vehicle top structure which may be assembled off-line and then be unitarily affixed or attached to the vehicle body;

(v) to provide a rigid vehicle top of unitary structure which can be economically manufactured and assembled;

(vi) to provide aesthetically pleasing vehicle top structures of durable nature.

Other objects and advantages of the present invention will become apparently from the following detailed description taken in conjunction with the accompanying drawings showing a plurality of preferable embodiments thereof.

DETAILED DESCRIPTION OF THE DRAWINGS

Figure 1:
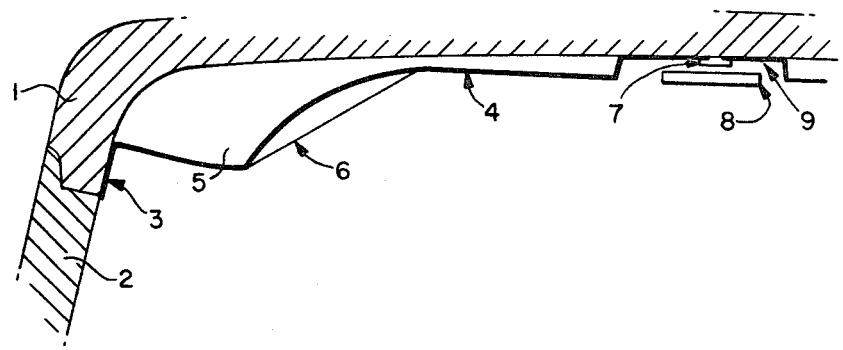
FIG. 1 is a transverse cross-sectional view of the affixation (attachment) and the vehicle top structure as affixed to a motor vehicle body which is assembled and constructed according to a preferred embodiment of the present invention.

Referring now in detail to the drawings and in particular to FIG. 1 thereof, a rigid, unitary and self-supporting vehicle roof portion 1, is affixed to vehicle body 2 by means of wall attaching flange 3. Other affixing or attachment embodiments are also contemplated. For example pressure sensitive adhesives, spot welding, nuts and bolts, etc. Self-supporting headliner 4 is preferably provided with a raceway 5 for electrical or air conditioning duct work. A flattened area 6 to provide direct seat lighting is also preferably provided. Ceiling fasteners 7 maintain rigid contact between headliner 4 and self-supporting vehicle roof portion 1 and are also preferably hidden for aesthetic purposes, from passenger view by decorative panels 8 which are recessed into a ceiling insert area 9. Affixation of vehicle roof portion 1 and headliner 4 to vehicle body 2 is maintained at all contact points in the manner previously described.

Placement of various instruments and indicators, i.e. clocks, speedometers, oil pressure gauge, tachometer, etc. may be such that all passengers may view them.

Figure 2:
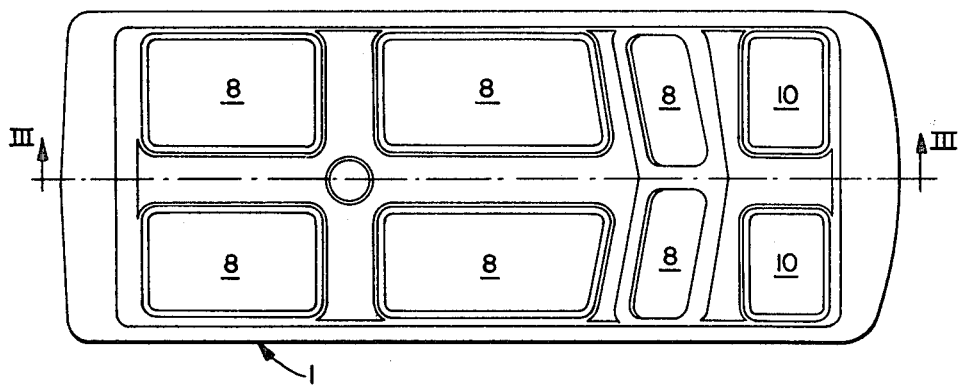
FIG. 2 is an interior plan view of an embodiment of a vehicle top structure according to the present invention.

FIG. 2 discloses a preferred embodiment of decorative panels 8, and, additionally, the usage of windows 10.

Figure 3:
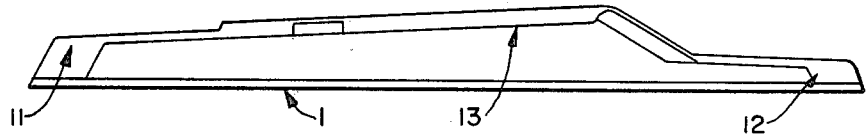
FIG. 3 is a cross-sectional right side view taken along line III—III of FIG. 2.

FIG. 3 is a sectional view of FIG. 2 along line III—III and further discloses rear molded storage compartment 11 and front molded console 12. A cross-sectional view of the interior liner 13 is also revealed.

Figure 4:
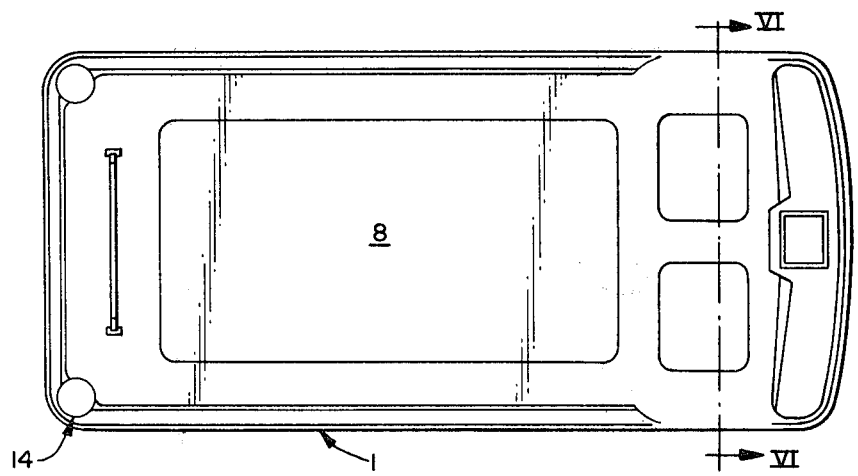
FIG. 4 is an interior plan view of another embodiment of the vehicle top structure of the present invention.

FIG. 4 reveals another embodiment of decorative panels 8 and the provision for stereo speakers 14.

Figure 5:
FIG. 5 is a rear view of the embodiment of FIG. 4.

FIG. 5 is a rear view of the embodiment of FIG. 4.

Figure 6:
FIG. 6 is a front sectional view along line VI—VI of the embodiment of FIG. 4.

FIG. 6 is a front sectional view along line VI—VI of FIG. 4.

Figure 7:
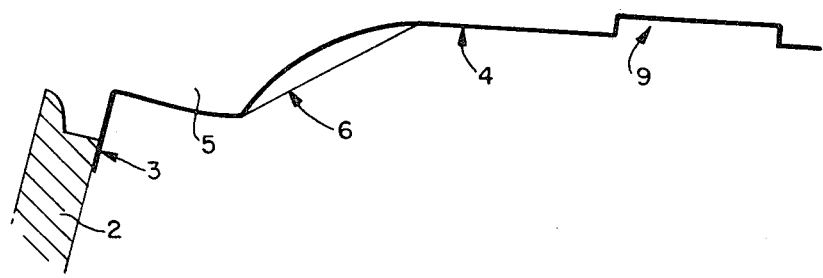
FIG. 7 is a transverse cross-sectional view of the affixation and joining area of a vehicle top structure conversion as affixed (attached) to a motor vehicle body constructed and assembled according to a preferred embodiment of the present invention.

FIG. 7, as previously stated, is a transverse, cross-sectional view of the affixation (attachment) and adjoining area of a vehicle top conversion structure as affixed to a motor vehicle body and constructed and assembled according to a preferred embodiment of the present invention.

From the above drawings and detailed description, the distinct advantages of constructing a rigid and unitary vehicle top structure consisting of a vehicle roof portion and headliner is readily recognizable. Since the headliner 4 is also rigid and of unitary structure, workers at an off-line location may assemble the vehicle roof portion 1 and headliner 4 structures to form the vehicle top without the inherent problems of a cramped working area. Workers would thus have ready and easy access to the wiring and duct work area between the self-supporting headliner and vehicle top 1. Consequently, the labor necessary per unit assembled would be drastically reduced. Furthermore, all clocks, radios, speakers, decorative panelling, etc. could be assembled into the headliner with ease at the off-line assembly area. Thus, a completely assembled vehicle top structure could be unitarily attached to the vehicle body at a predetermined point or points in the assembly line.

Another application of the present method and structure resides in vehicle top conversions. A hypothetical owner of a vehicle might desire an aesthetic "new look" or additional space in his vehicle. Such a modification could be readily practiced through usage of the present rigid unitary vehicle top structure. In this regard, workers would merely have to cut off the existing vehicle top structure, preferably three inches below the roof line, and then attach the new vehicle top structure of the owner's choice. Therefore a quite economical modification of existing vehicles may be envisioned through application of the present invention.

The present invention lends itself to yet another unique and unobvious construction method. In this regard, a conversion dealer would simply cut off the existing vehicle top structure and then affix the rigid, unitary, self-supporting molded headliner of the present invention to the sidewalls of the vehicle to be converted. Thereafter, electrical wiring duct work etc. could be easily affixed to the headliner since the area above the headliner which would eventually be beneath the vehicle roof structure would be readily accessible to the workers. Thereafter the vehicle roof structure would be attached to the body sidewalls above the headliner. While this method might involve slightly more labor costs (due to the double attachment costs necessary), these costs could be well overcome through a dealer not having to carry a large inventory of all possible combinations of headliners/vehicle roof structures.

While it will be apparent that the preferred embodiments of the invention disclosed are well calculated to fulfill the objects abovestated, it will be appreciated that the invention is acceptable to modification, variation and/or change without departing from the proper scope or fair meaning of the claims appended hereto.

We claim:

1. A method of converting a passenger compartment of a motor vehicle of the type bound by body side walls and a roof structure attached to the top of said side walls, comprising:
   cutting through the side walls at a position below the roof structure and removing the roof structure and upper portion of the side walls as a unit from the vehicle passenger compartment,
   forming a vehicle roof,
   forming a relatively rigid self-supporting headliner separate from the vehicle roof, including means for accommodating vehicle lighting fixtures and the like,
   attaching said self-supporting headliner to the top of the cut side walls of the vehicle,
   attaching said vehicle roof on top of said headliner and to the top of the cut side walls of the vehicle to form a vehicle body top structure,
   whereby assembly workers are allowed great freedom of movement and ease of access in assembling said headliner and said vehicle roof.

2. The method of claim 1, further comprising affixing electrical wiring to the headliner from above after attaching the headliner to the side walls and before attaching the roof to the side walls.

3. The method of claim 1 or 2, further comprising affixing duct work to the headliner from above after attaching the headliner to the side walls and before attaching the roof to the side walls.

4. The method of claim 1, comprising fastening said roof part and said headliner by ceiling fasteners to maintain rigid contact between said roof and headliner.

5. The method of claim 4, comprising attaching decorative panel means to said headliner to conceal said ceiling fasteners.

6. The method of claim 1, comprising forming said roof with attaching flange means, wherein said attaching of the roof includes placing said attaching flange means in contact with at least one of said headliner and said side walls.

7. The method of claim 1, wherein said forming said headliner includes forming of a raceway for electrical or air conditioning duct work in said headliner.

8. The method of claim 1, wherein said forming said headliner includes forming a rear molded storage compartment and a front molded in console in said headliner.

9. The method of claim 1, wherein said forming said headliner includes forming a flattened area in said headliner to provide direct seat lighting.

10. The method of claim 7, wherein said forming said headliner includes forming a rear molded storage compartment and a front molded in console in said headliner.

11. The method of claim 10, wherein said forming said headliner includes forming a flattened area in said headliner to provide direct seat lighting.

12. The method of claim 7, further comprising affixing electrical wiring to the headliner from above after attaching the headliner to the side walls and before attaching the roof to the side walls.

* * * * *